United States Patent Office 3,154,393
Patented Oct. 27, 1964

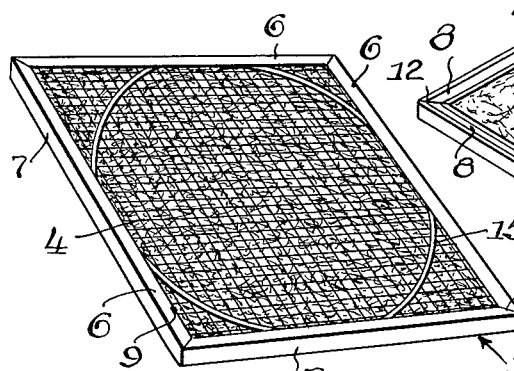
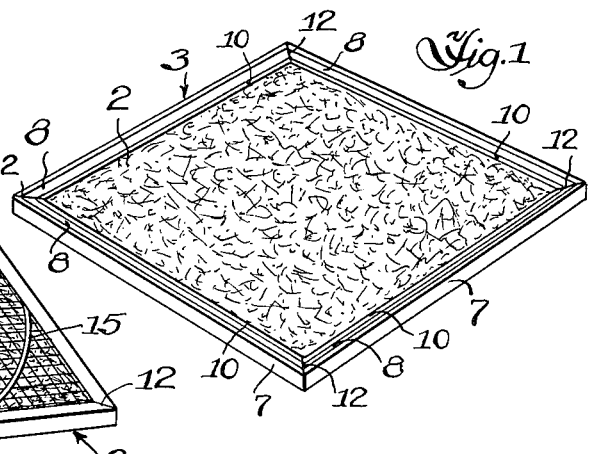
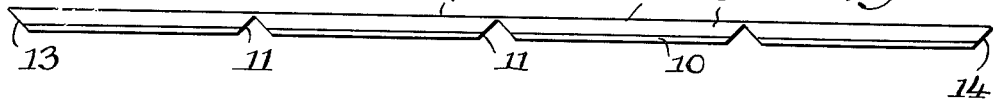
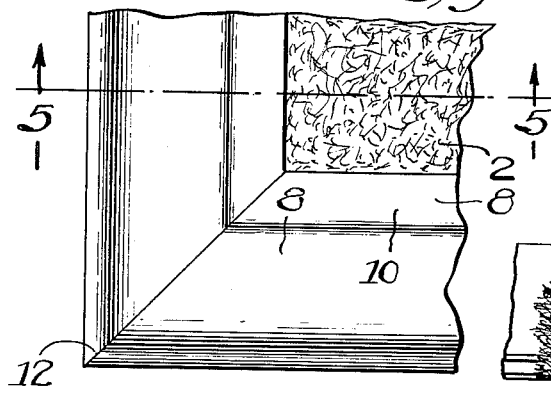
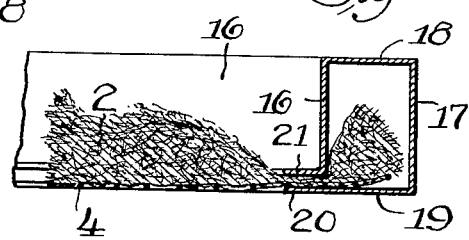
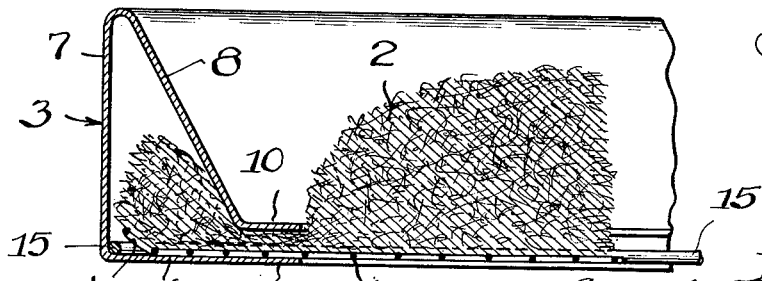

3,154,393
GAS FILTER
Joseph J. Klein, Glencoe, and Jean B. Durgeloh, Melrose Park, Ill., assignors to Fiber Bond Corporation, a corporation of Illinois
Filed Apr. 18, 1958, Ser. No. 729,342
4 Claims. (Cl. 55—501)

This invention relates to a filter for filtering air or other gases, and is particularly concerned with bonding the edges of the filter to an inexpensive frame adapted to facilitate the handling and use of the filter.

Air filters of the type with which the present invention is concerned are adapted for use with air conditioning or heating systems. The filter preferably comprises an adhesively bonded fibrous web bonded to an open cloth backing which serves as a reinforcement and helps the fibrous web retain its shape. Examples of suitable types of fibrous webs are fully disclosed in the prior copending applications of Joseph J. Klein, Serial Nos. 676,278 and 676,657, filed August 5, 1957 and August 6, 1957, which have issued as Patents Nos. 3,005,516 and 2,988,169, respectively.

Although the filter web may be made of many different synthetic or natural fibers, it is preferred to make it of a thermoplastic fiber, such as, for example, acrylic fiber (a copolymer of vinyl chloride and acrylonitrile) commercially available under the trademark "Dynel."

The filter web is preferably formed by adhering the fibers to each other in random three-dimensional arrangement with polyvinyl acetate adhesive, but may be formed in any conventional manner. Other thermoplastic adhesives, such as polyvinyl chloride or copolymers of polyvinyl acetate and polyvinyl chloride may be used. The adhesive is preferably applied in the form of an aqueous emulsion or suspension, but may be applied as a solution in any desired solvent.

A frame shaped to provide suitable rigidity for the filter is formed from a continuous strip or from a plurality of separate frame members. The frame is preferably made of chip board or other paperboard, but may be made of metal or plastic. The frame is heat sealed to the edges of the web, preferably by the application of high frequency dielectric heating and pressure. Polyvinyl acetate is preferred as the adhesive because it has an unusually effective adhesive affinity for paper when it is heated to softening by high frequency dielectric heating, and the fibers cannot be separated from the frame by any ordinary handling. The frame may be temporarily secured to the edges of the filter in any suitable manner, as, for example, by stapling, to insure proper positioning of the frame relative to the fibrous web, but the frame is permanently secured to the edges of the fibrous web by heat sealing which fuses the fibers to each other and to the frame.

A stiffening ring may be positioned between the frame and the backing of the fibrous web to add rigidity to the filter structure. The stiffening ring is preferably made of thermoplastic material and is fused into the joint formed by heat sealing the frame to the edges of the fibrous web. If the stiffening ring is made of metal it will be securely held against displacement by heat sealing the frame and the fibrous web to the stiffening ring.

The structure by means of which the above noted and other advantages of the invention are attained will be specifically described in the following specification, taken in conjunction with the accompanying drawings, showing two preferred illustrative embodiments of the invention, in which:

FIGURE 1 is a perspective view of a filter embodying the invention;

FIG. 2 is a rear perspective view of the filter showing a stiffening ring positioned between the frame and the web of the filter;

FIG. 3 is a side elevational view of a paperboard strip notched for folding into a frame for the filter web;

FIG. 4 is an enlarged fragmentary top plan view of one corner of the filter;

FIG. 5 is a cross sectional view, taken along the line 5—5 of FIG. 4; and

FIG. 6 is a fragmentary cross sectional view of a modified embodiment of the invention.

Referring to the drawings, the reference numeral 2 indicates a fibrous web in which the individual fibers are bonded together in any suitable manner. A random three-dimensional arrangement of fibers is preferred because of the greater filtering efficiency afforded by such arrangement, but the present invention may be used with any fibrous web. We prefer to use acrylic fibers (a copolymer of vinyl chloride and acrylonitrile) commercially available under the trademark "Dynel," although other fibers, particularly thermoplastic fibers such as nylon, rayon, cellulose acetate, acrylic fiber (formed from a polymer of acrylonitrile) commercially available under the trademark "Orlon," polyvinylidene chloride-polyvinyl chloride copolymer fiber commercially available under the trademark "Saran," and the like may be used.

As stated above, our invention may be used with any fibrous web capable of use for filtering air. We have found, however, that fibers to which oil is applied, such as glass fibers, for example, which have satisfactory filtering characteristics are not preferred because they can be cleaned only by washing. The preferred fibers form a dry filter that can be cleaned by vacuum.

The fibers are preferably bonded with polyvinyl acetate although other thermoplastic adhesives such as polyvinyl chloride or copolymers of polyvinyl acetate and polyvinyl chloride produce very satisfactory results. Other conventional adhesives may also be used if the fibers are thermoplastic, but only thermoplastic adhesives are satisfactory with fibers that are not thermoplastic. For convenience of handling, it is preferred to bond an open work textile backing 4 to one surface of the fibrous web.

A frame 3 comprises a strip 5 of paperboard, preferably chip board, or metal, folded longitudinally to provide a right angular cross section indicated by a base 6, a vertical wall 7, and an inclined wall 8. An integral coplanar flange 9 extends inwardy from the base, and a flange 10 extends from the edge of inclined wall 8 in parallel relationship to flange 9. Flanges 9 and 10 are juxtaposed against opposite surfaces of fibrous web 2. The triangular cross sectional shape is preferred for frame 3 because of its inherent rigidity. If the frame is made of plastic material it is molded in the desired cross sectional shape. Whether the frame is made of separate members or as a unitary strip, the inclined walls 8, and flange 10 integral therewith, are separated from adjacent inclined walls so the flanges 10 may be moved relative to flanges 9, whereby the edges of the filter can be positioned between the flanges.

Frame 3 may be formed of a continuous strip 5 notched, as indicated at 11, to form bevelled corners 12, or may be formed of a plurality of separate frame members. Although the filter is illustrated as rectangular, it is obvious that it may have any desired shape. The free ends 13 and 14 of the frame which abut each other may be secured temporarily by any suitable means, such as adhesive tape or staples, until the frame is permanently secured to the edges of the fibrous web as hereinafter described.

After the frame and fibrous web are assembled, flanges 9 and 10 of the frame and the intervening edge portions of fibrous web 2 are heat sealed into a unitary structure, preferably by an electronic heat-sealing device which provides heat by means of radio frequency waves. Other suitable conventional heat-sealing means may be employed, is desired. Enough heat and pressure must be applied to fuse the thermoplastic fibers of the web to each other and to the frame. If thermoplastic adhesive is used it is also fused to the fibers and the frame.

Although the filter as hereinabove described is sufficiently rigid for satisfactory use, it is sometimes preferred to provide a stiffening ring 15 for increased rigidity. Portions of stiffening ring 15 are interposed between backing 4 of the fibrous web and base 6 of the frame. The stiffening ring may be thermoplastic, in which event the portions of it interposed between flanges 9 and 10 of the frame are fused with the fibrous web in these areas. If the stiffening ring is metal, the fibrous web will be fused to it as well as to the frame.

The embodiment of FIG. 6 differs from the embodiments of FIGS. 1 to 5 only in the specific cross sectional shape of the frame. In FIG. 6 the frame is rectangular is cross section and has two vertical walls 16 and 17, a top 18 and a base 19. A coplanar flange 20 extends from base 19 and a flange 21 extends from wall 16 in parallel relationship to flange 20. The fibrous web 2 is heat sealed to flanges 20 and 21 just as in the previous embodiment. A stiffening ring may also be applied to this embodiment, if desired.

Although we have described two embodiments of our invention in considerable detail, it will be understood that the description is intended to be illustrative, rather than restrictive, as many details of the invention may be modified or changed without departing from the spirit or scope of our invention. Accordingly, we do not desire to be restricted to the exact structures described.

We claim:

1. A filter comprising a web of thermoplastic fibers, a frame overlapping the edge portions of said web, and a stiffening ring having portions thereof interposed between said web and overlapping portions of said frame, said web and frame being heat sealed into a unitary structure.

2. A filter comprising a web of thermoplastic fibers, a frame embracing the edges of said web, and a thermoplastic stiffening ring having portions thereof interposed between said web and said frame, said web, frame and stiffening ring being heat sealed into a unitary structure.

3. A filter comprising a web of thermoplastic fibers, a frame, and a stiffening ring interposed between said web and said frame, said frame comprising a strip of paperboard folded longitudinally to form parallel flanges juxtaposed on opposite surfaces of said web, said flanges being heat sealed to the fibers of said web.

4. A filter comprising a fibrous web, a frame, and a thermoplastic stiffening ring interposed between said fibrous web and said frame, said frame comprising a strip of paperboard folded longitudinally to form parallel flanges juxtaposed on opposite surfaces of said fibrous web, said flanges, web and stiffening ring being heat sealed to form a unitary structure.

References Cited in the file of this patent
UNITED STATES PATENTS

| | | |
|---|---|---|
| 1,105,857 | Snook | Aug. 4, 1914 |
| 2,220,127 | Slayter | Nov. 5, 1940 |
| 2,463,054 | Quayle et al. | Mar. 1, 1949 |
| 2,521,984 | Lang | Sept. 12, 1950 |
| 2,612,966 | Nicol | Oct. 7, 1952 |
| 2,642,911 | De Shazor | June 23, 1953 |
| 2,677,436 | Mazek | May 4, 1954 |
| 2,684,319 | Arnold | July 20, 1954 |
| 2,754,928 | Hambrecht | July 17, 1956 |
| 2,784,132 | Maisel | Mar. 5, 1957 |
| 3,003,581 | Greason | Oct. 10, 1961 |